United States Patent
Pampinella

(10) Patent No.: US 6,422,064 B1
(45) Date of Patent: Jul. 23, 2002

(54) LEAK TESTING DEVICE

(75) Inventor: Joseph A. Pampinella, Vienna, VA (US)

(73) Assignee: Inflow Products, Inc., Vienna, VA (US)

( * ) Notice: Subject to any disclaimer, the term of this patent is extended or adjusted under 35 U.S.C. 154(b) by 0 days.

(21) Appl. No.: 09/845,217

(22) Filed: May 1, 2001

Related U.S. Application Data

(63) Continuation-in-part of application No. 09/340,438, filed on Jun. 28, 1999, now Pat. No. 6,234,007.

(51) Int. Cl.[7] .............................. G01M 3/04; F16K 3/02
(52) U.S. Cl. .............................. 73/49.8; 73/46; 138/89; 138/90; 138/94; 251/319
(58) Field of Search ...................... 73/49.8, 40, 40.5 R, 73/49.1, 49.5; 138/89, 90, 94; 251/319, 324

(56) References Cited

U.S. PATENT DOCUMENTS

| | | | | |
|---|---|---|---|---|
| 1,133,714 A | | 3/1915 | Elder | 251/87 |
| 1,928,316 A | | 9/1933 | Muto | 73/49.8 |
| 2,823,887 A | | 2/1958 | Osinski | 251/148 |
| 2,953,015 A | * | 9/1960 | Carrie | 73/49.8 |
| 3,232,577 A | | 2/1966 | Sargent | 251/87 |
| 3,941,349 A | | 3/1976 | Pierson | 251/100 |
| 3,945,604 A | | 3/1976 | Clarkson | 251/174 |
| 4,019,371 A | * | 4/1977 | Chaplin et al. | 73/46 |
| 4,176,756 A | | 12/1979 | Gellman | 215/274 |
| 4,194,721 A | | 3/1980 | Nachtigahl | 251/148 |
| 4,407,171 A | * | 10/1983 | Hasha et al. | 73/46 |
| 4,429,568 A | | 2/1984 | Sullivan | 73/49.8 |
| 4,602,504 A | * | 7/1986 | Barber | 73/49.8 |
| 4,763,510 A | | 8/1988 | Palmer | 73/40.5 R |
| 4,795,197 A | | 1/1989 | Kaminski et al. | 285/12 |
| 4,895,181 A | | 1/1990 | McKavanagh | 137/375 |
| 5,018,768 A | | 5/1991 | Palatchy | 285/24 |
| 5,076,095 A | | 12/1991 | Erhardt | 73/49.8 |
| 5,197,324 A | | 3/1993 | Keys | 73/40.5 R |
| 5,269,568 A | | 12/1993 | Courturier | 285/80 |
| 5,287,730 A | | 2/1994 | Condon | 73/49.8 |
| 5,385,373 A | | 1/1995 | Love | 292/307 B |
| 5,782,499 A | | 7/1998 | Gfrerer et al. | 285/23 |
| 6,000,278 A | * | 12/1999 | Hystad | 73/46 |
| 6,131,441 A | * | 10/2000 | Berube et al. | 73/49.8 |
| 6,234,007 B1 | * | 5/2001 | Pampinella | 73/49.8 |
| 6,299,216 B1 | * | 10/2001 | Thompson | 285/93 |

* cited by examiner

*Primary Examiner*—Hezron Williams
*Assistant Examiner*—David J. Wiggins
(74) *Attorney, Agent, or Firm*—Dinesh Agarwal, P.C.

(57) ABSTRACT

A leak testing device includes a generally cylindrical elongated sealing gasket which defines a recess therethrough. The gasket includes first and second end portions for receiving the respective ends of two adjacent conduits. A shoulder portion extends radially into the recess for supporting a diaphragm member thereon. The diaphragm member includes a diameter substantially corresponding to the diameter of the recess. In a preferred embodiment, the diaphragm member is made integral with the gasket. A hole is provided in the diaphragm member which can be selectively opened or closed by a valve assembly provided on the diaphragm member to thereby permit or restrict the flow of a fluid between the two conduits.

36 Claims, 6 Drawing Sheets

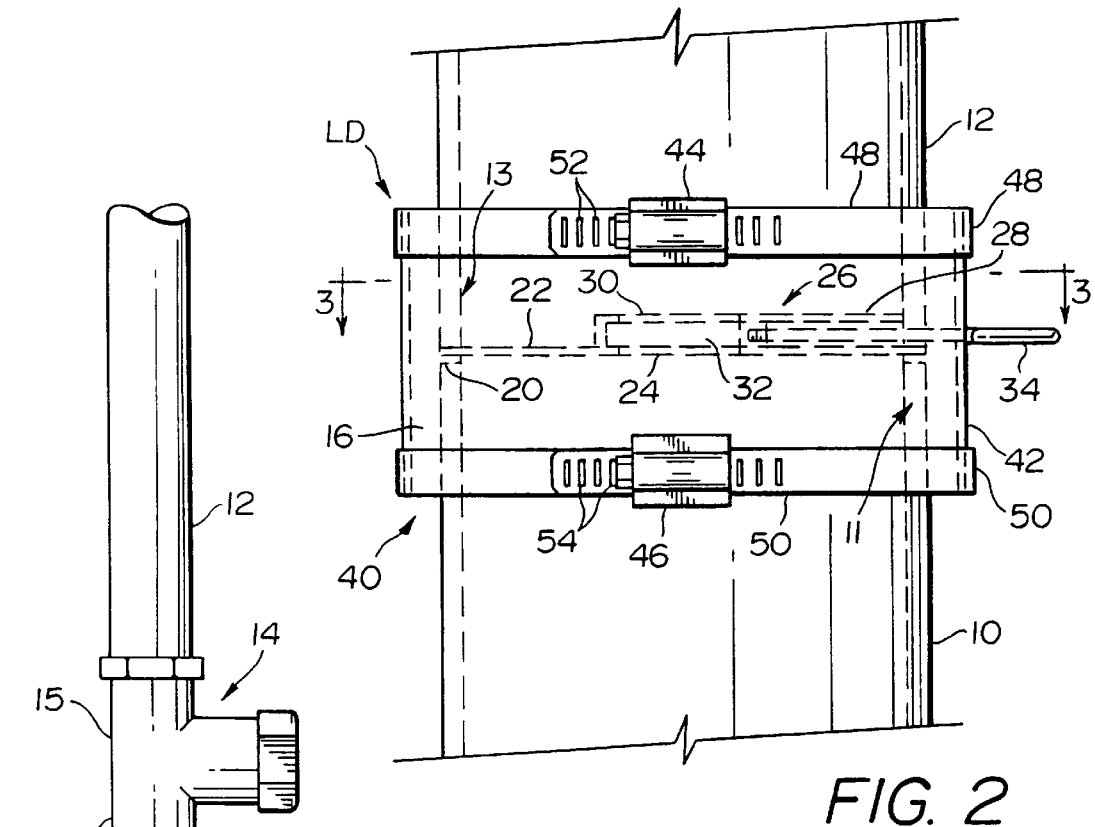
FIG. 2
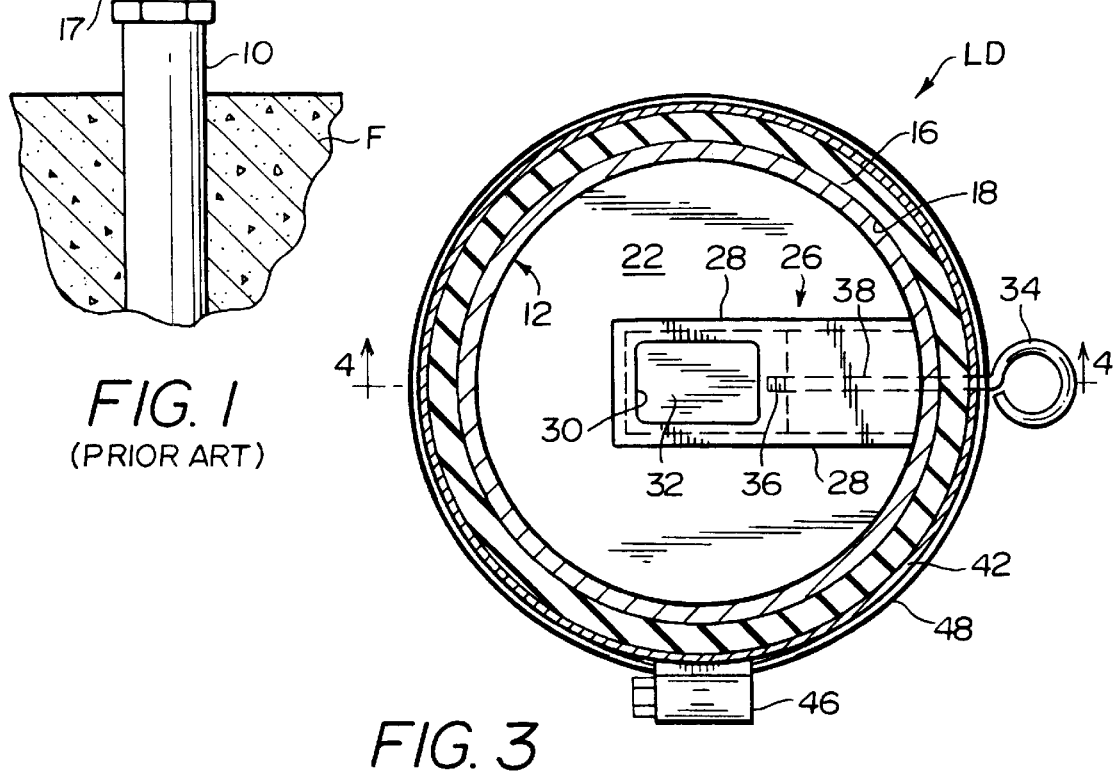
FIG. 1
(PRIOR ART)
FIG. 3

US 6,422,064 B1

LEAK TESTING DEVICE

This is a continuation-in-part of application Ser. No. 09/340,438, filed on Jun. 28, 1999, now U.S. Pat. No. 6,234,007 which is incorporated herein in its entirety by reference.

FIELD AND HISTORICAL BACKGROUND OF THE INVENTION

The present invention is directed to a leak testing device to be positioned between two adjacent conduits, or adjacent an end of a single conduit.

In the plumbing industry, it is common to test pipes for leaks prior to use. In particular, in the installation of new plumbing systems in buildings, or the replacement of an existing pipe, the government regulations require that a pipe be leaked-tested prior to its use as part of the overall plumbing system. The current practice is to install a T-fitting between the new pipe and an existing adjacent pipe. The two arms of the T-fitting are vertically connected to the ends of the new and existing pipes with a conventional split-clamp assembly. The side-arm of the T-fitting includes a screw-on cap which can be removed for allowing access to the inside of the T (FIG. 1).

The testing procedure involves a plumbing professional to manually insert a pneumatically inflatable plug through the side-arm of the T-fitting and into the end opening of the new pipe. The plug is then inflated to seal-off the new pipe opening leading into the T-fitting. The new pipe, which in many instance extends to one or more floors of a building, is the n filled with a fluid, typically water, and is left in this condition until a government official visually inspects the new pipe for any leaks. Upon completion of the inspection, the fluid from the new pipe must be discharged for final assembly of the plumbing system. The fluid discharge involves deflating the plug by actuating a valve located on the plug which is completely hidden inside the T-fitting. The access to the valve is typically gained through the side-arm of the T-fitting.

The current practice of deflating the plug and removing it from inside the T-fitting is not very desirable in that severe physical injury, including death, or property damage may result if the plug fails for any reason, or due to improper handling thereof. The inflation of the plug to a desired pressure of 30 PSI, and its deflation at the completion of the testing procedure, requires additional equipment and proper training of the associated technician. This procedure further involves the use of a T-fitting which adds to the overall expense of the testing procedure. Finally, in many instances, the inflatable plug weakens or gets damaged due to inflation and deflation and can not be reused.

In view of the above, there is a need in the industry for a leak testing device which is safe for the plumbing professional and the surrounding property, inexpensive to manufacture, easy to use, and simple in construction.

Examples of various valves and pipe testing devices are disclosed in U.S. Pat. Nos. 1,133,714; 2,823,887; 3,232,577; 3,941,349; 3,945,604; 4,194,721; 5,076,095; and 5,197,324.

OBJECTS AND SUMMARY OF THE INVENTION

The principal object of the present invention is to provide a leak testing device which does not suffer from the disadvantages of the conventional devices.

An object of the present invention is to provide a leak testing device which can be easily provided between two adjacent conduits, or adjacent an end of a single conduit.

Another object of the present invention is to provide a leak testing device which is safe to use in that it does not threaten physical injury to the plumbing professional, property damage, or damage to others.

Yet another object of the present invention is to provide a leak testing device which eliminates the use of a T-fitting.

An additional object of the present invention is to provide a leak testing device which does not require additional equipment, such as a pneumatic pump or the like for inflation and deflation purposes.

Yet an additional object of the present invention is to provide a leak testing device which is simple in construction, inexpensive to manufacture and is reusable.

In summary, the main object of the present invention is to provide a leak testing device which can be easily installed between two adjacent conduits. The device is simple in construction, easy to use and reuse, and does not pose danger of bodily harm to the plumbing professional and associated personnel or risk of property damage, and is inexpensive to manufacture.

In accordance with the invention, a leak testing device includes a generally cylindrical elongated sealing gasket which defines a recess therethrough. The gasket includes first and second end portions for receiving the respective ends of two adjacent conduits. A shoulder portion extends radially into the recess for supporting a diaphragm member thereon. The diaphragm member includes a diameter substantially corresponding to the diameter of the recess. In a preferred embodiment, the diaphragm member is made intregal with the gasket. A hole is provided in the diaphragm member which can be selectively opened or closed by a valve assembly provided on the diaphragm member to thereby permit or restrict the flow of a fluid between the two conduits.

In accordance with another aspect of the invention, a leak testing device includes a generally cylindrical sealing gasket which defines a recess therethrough. The gasket includes first and second end portions for receiving the respective ends of two adjacent conduits, and a shoulder portion extending into the recess. A diaphragm member is positioned within the gasket and includes a groove for receiving the shoulder portion. A hole is provided in the diaphragm member which can be selectively opened or closed by a valve assembly operably connected to the diaphragm member to thereby permit or restrict the flow of a fluid between the two conduits.

In accordance with yet another aspect of the invention, a leak testing device includes a generally cylindrical gasket defining a recess, therethrough. The gasket includes a first end portion for receiving an end of a conduit. A diaphragm member is positioned within the gasket and includes a through hole. First and second connecting members are provided for interconnecting the gasket and the diaphragm member. A valve is operably connected to the diaphragm member for selectively opening or closing the hole to thereby permit or restrict the flow of a fluid therethrough.

BRIEF DESCRIPTION OF THE DRAWINGS

The above and other objects, advantages and novel features of the present invention will become apparent from the following detailed description of the preferred embodiment of the invention, illustrated in the accompanying drawings, wherein:

FIG. 1 is a partial elevational view of a plumbing system showing a T-fitting installed between two conduits;

FIG. 2 is a partial elevational view showing the leak testing device of the invention installed in cooperation with two adjacent conduits;

FIG. 3 is a cross-sectional view taken along line 3—3 of FIG. 2;

DETAILED DESCRIPTION OF THE INVENTION

As illustrated in FIG. 1, the leak testing device LD of the present invention is used in connection with an existing pipe or conduit 10 extending from a floor F or the like, and a new pipe 12. Conventionally, a T-fitting 14 is provided between the existing and new pipes 10 and 12, respectively, prior to testing the new pipe 12 for any leaks. In this regard, it is noted herewith that the leak testing device LD of the present invention can be used with a T-fitting, and preferably without a T-fitting, as shown in FIG. 2.

Figure 4:
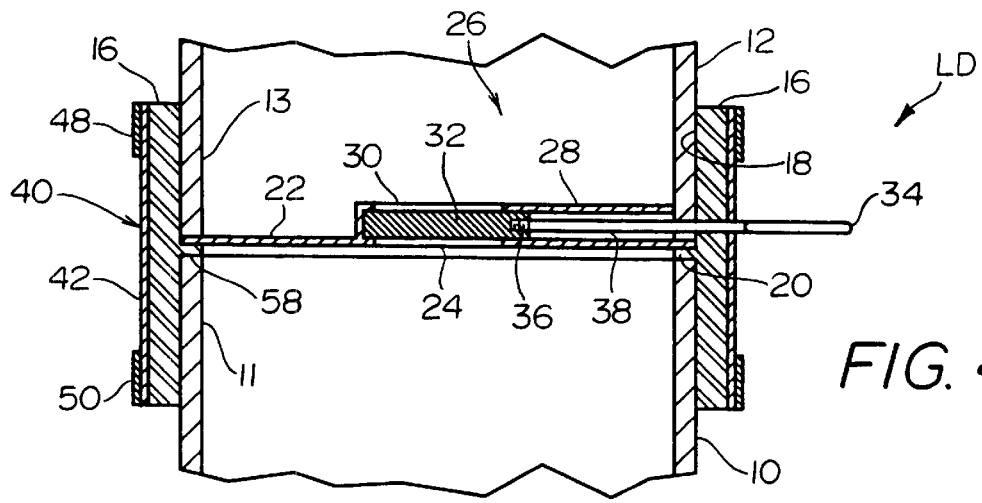
FIGS. 4 is a vertical cross-sectional view taking along line 4—4 of FIG. 3.
Figure 5:
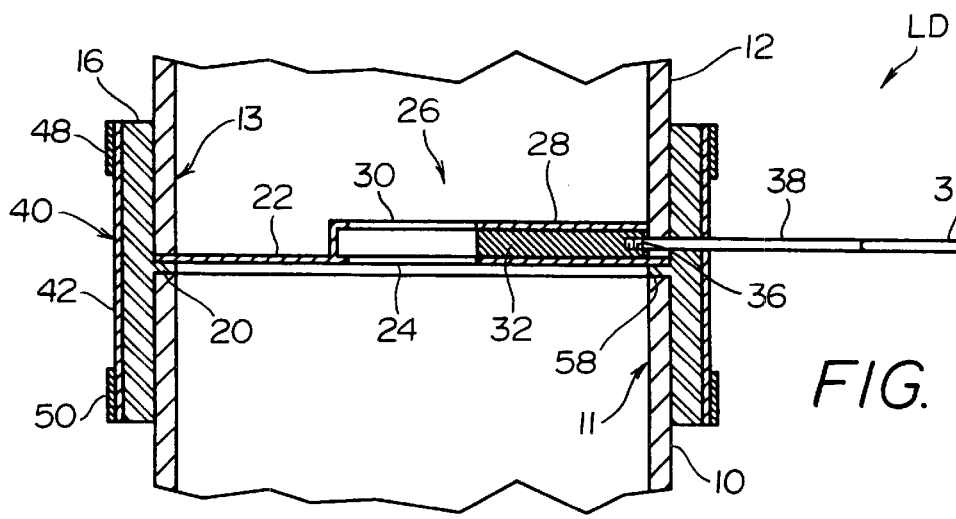
FIG. 5 is a view similar to FIG. 4, showing the valve in the open position.

As best shown in FIG. 3, the leak testing device LD includes a generally cylindrical elongated gasket 16 which defines therein a recess 18. As best illustrated in FIGS. 4–5, a shoulder or lip portion 20 extends radially into the recess 18, and preferably extends throughout the internal perimeter of the gasket 16. In other words, shoulder portion 20 is in the form of an internal ring that extends radially into the recess 18. A substantially circular diaphragm member 22, with a central hole 24, is provided so as to rest on the diaphragm member 22. Preferably, the gasket 16 is made of a resilient or compressible material, and the diaphragm member 22 is made of a generally rigid, yet somewhat flexible material. The diameter of the diaphragm member 22 substantially corresponds to the recess 18 in order to provide a fluid-tight engagement therebetween.

As best shown in FIGS. 2–5, the diaphragm member 22 includes a valve assembly 26. Preferably, the valve assembly 26 includes a valve chamber 28 integral with the diaphragm member 22. The valve chamber 28 includes an upper opening 30 which is in vertical alignment with the hole 24 in the diaphragm member 22. A manually actuable valve member 32 slides within the chamber 28 between a closed position (FIGS. 2–4) and an open position (FIG. 5). The dimensions of the valve member 32 are selected so as to substantially correspond to the dimensions of the valve chamber 28, so that when the valve member 32 is in the closed position (FIGS. 2–4), the flows of fluid between the conduits 12 and 10 is restricted. Likewise, when the valve member 32 is in the open position (FIG. 5), the fluid flows between the conduits 12 and 10, through the upper opening 30, valve chamber 28 and the hole 24. In order to facilitate the opening and closing of the valve 32, a manually actuable valve handle 34 is detachably connected to the valve member 32. Preferably, interlocking screw-threads 36 are provided on the valve stem 38 and the valve member 32. As can be observed from FIGS. 2–5, the valve stem 38 extends through the gasket 16 for being detachably connected to the valve member 32.

The leak testing device LD further includes a split-clamp assembly 40 (FIGS. 1–2). In particular, the clamp assembly 40 includes a metal ring 42 split about the location of conventional upper and lower mechanical fasteners 44 and 46. The fasteners 44 and 46 are parts of upper and lower metallic rings 48 and 50, respectively, the diameter of which about the perimeter of the metal ring 42, can be adjusted by actuating fasteners 44 and 46 and interlocking with corresponding series of holes 52 and 54, in a known manner.

Figure 6:
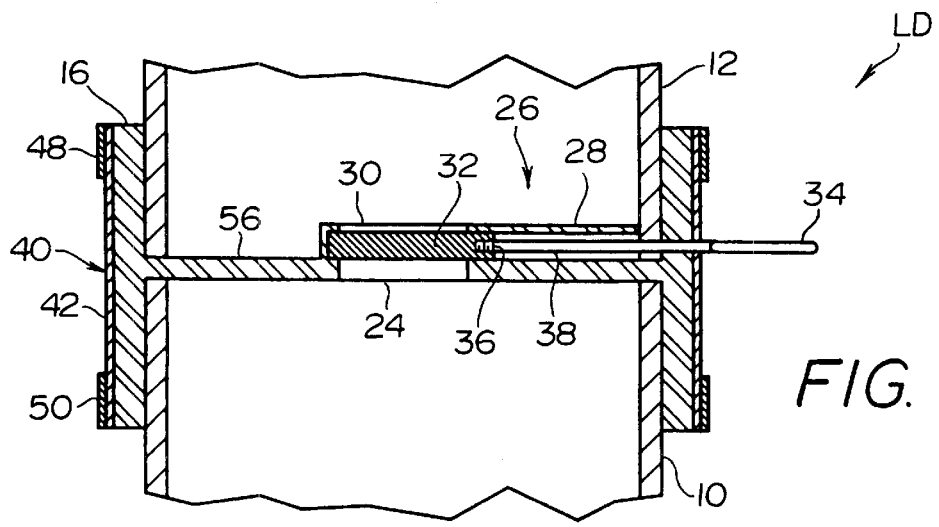
FIG. 6 is a view similar to FIG. 4, showing an alternative embodiment of the leak testing device.

FIG. 6 illustrates an alternative embodiment of the leak testing device LD of the invention, which is similar to the embodiment shown in FIGS. 2–5, with the exception that the diaphragm member 56 is integral with the gasket 16. (It is noted herewith that in the alternative embodiment like parts are designated with the same reference numerals as in the embodiment shown in FIGS. 2–5.) Preferably, the diaphragm member 56 is made slightly thicker than the diaphragm member 22, in order to impart sufficient strength to withstand fluid pressure when the new pipe 12 is filled with a fluid.

FIGS. 7–13 illustrate various other embodiments of the leak testing device LD of the invention, wherein like parts are also designated with the same reference numerals as in the embodiments shown above in FIGS. 2–6.

Figure 7:
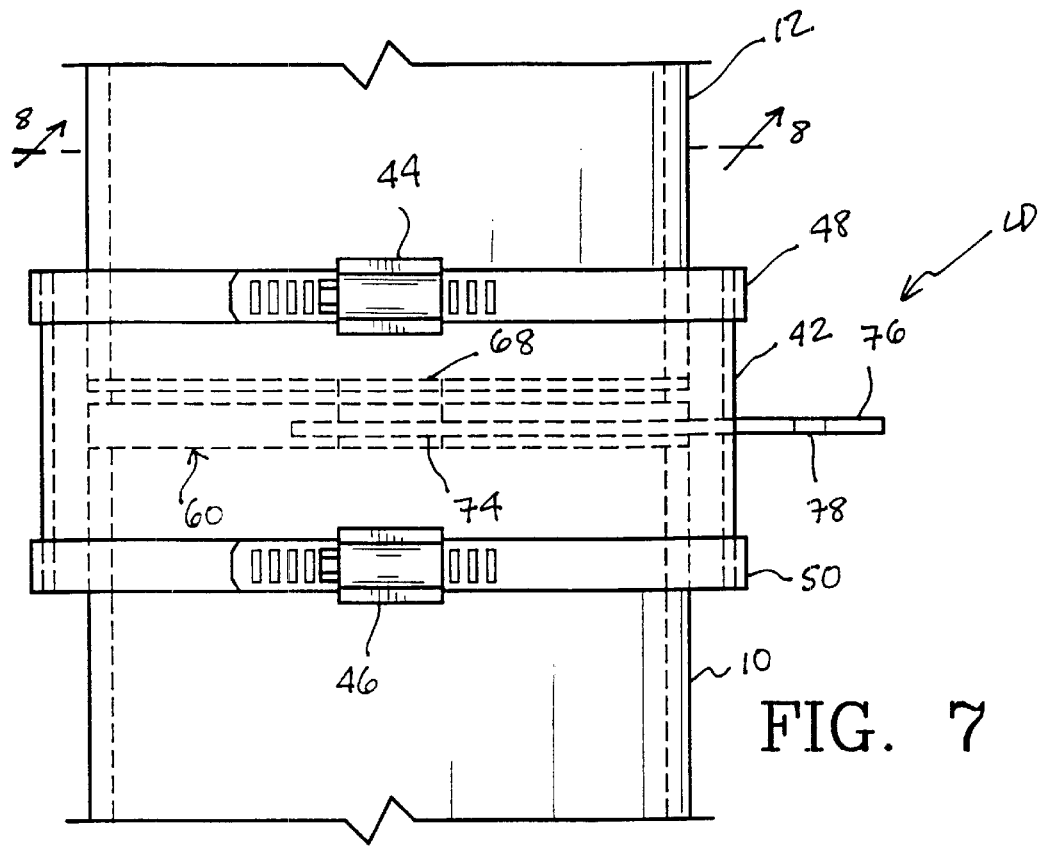
FIG. 7 is a view similar to FIG. 2, showing a second alternative embodiment of the leak testing device.
Figure 8:
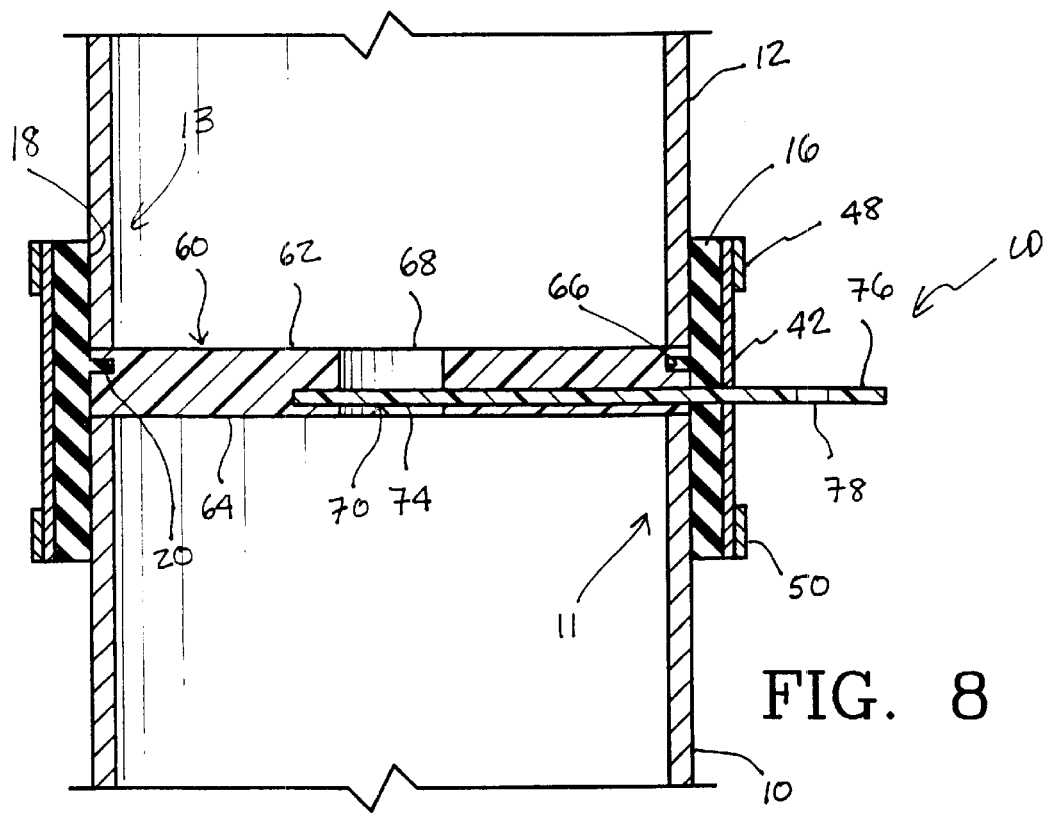
FIG. 8 is a vertical cross-sectional view taken along line 8—8 of FIG. 7.
Figure 9:
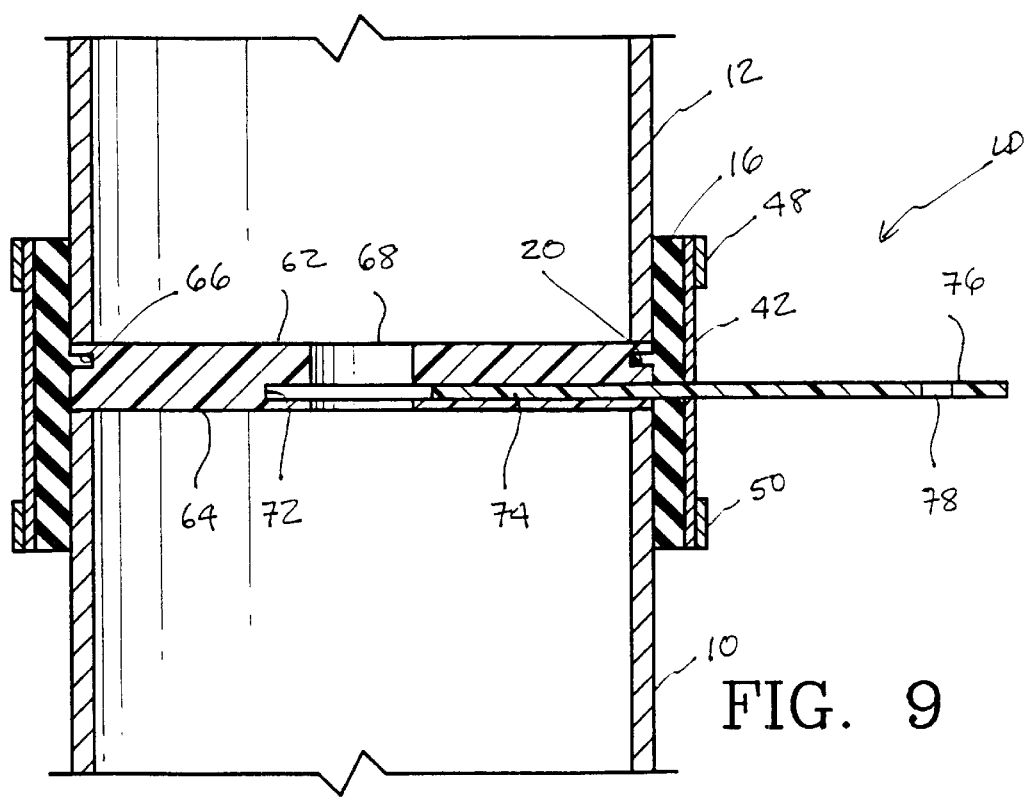
FIG. 9 is a view similar to FIG. 8, showing the valve in the open position.

Referring now to FIGS. 7–9, the leak testing device LD, according to a second alternative embodiment, is similar to the embodiment shown in FIGS. 2–5, with the exception of the configuration of the diaphragm member 60. As shown, the diaphragm member 60 includes axially spaced surfaces 62 and 64, and a radially inwardly extending groove 66 that is dimensioned to receive the shoulder portion 20 of the gasket 16. Preferably, the groove 66 extends throughout the external perimeter of the diaphragm 60. It is noted herewith that it is not necessary for the shoulder portion 22 to extend throughout the external perimeter of the gasket 16. For example, one or more shoulder portions 20 may be circumferentially spaced about the internal perimeter of the gasket 16. Likewise, one or more corresponding grooves 66 may be provided on the external perimeter of the diaphragm 60 to receive the circumferentially spaced shoulder portions 20.

The diaphragm member 60 is preferably made of a rigid plastic, metal, PVC, or the like material and includes a hole 68. As in the previous embodiments, the diameter of the diaphragm member 60 substantially corresponds to the recess 18 of the gasket 16 in order to provide a fluid-tight engagement therebetween.

As best shown in FIGS. 8–9, a valve assembly 70 includes a radially extending recess 72 in the diaphragm member 60 for receiving a valve 74 member therein. The valve 74 is preferably integral with a valve handle 76 positioned externally of the gasket 16. The recess 72 is in fluid communication with the hole 68. A hole 78 is provided in the valve handle 76 for the ease of holding and actuation thereof.

Preferably, the shoulder portion 20 is axially spaced from the recess 72. In other words, shoulder portion 20 is adjacent diaphragm surface 62 and the valve assembly 70 is adjacent diaphragm surface 64. It is noted herewith that the relative positions of the shoulder portion 20 and the valve assembly 70 could be varied.

Figure 13:
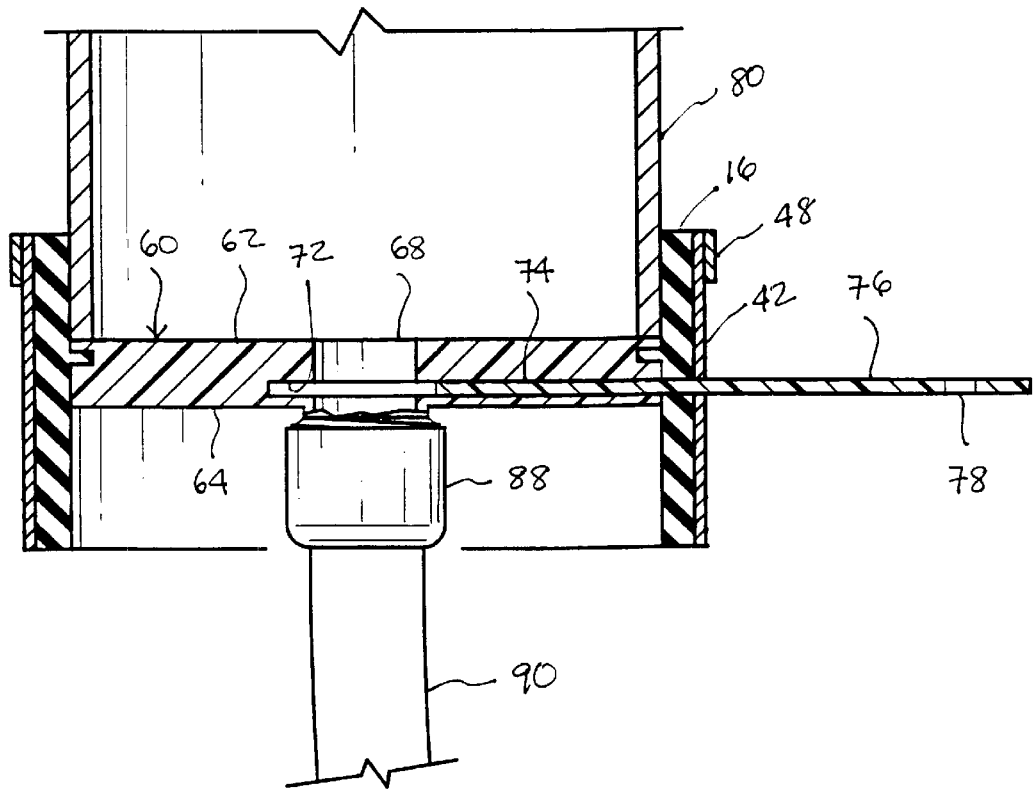
FIG. 13 is a view similar to FIG. 12, showing a hose connected to the fluid discharge member.

FIG. 13 illustrates the leak testing device LD, shown in FIGS. 7–9, installed adjacent an end 79 of a single conduit 80. This type of arrangement is useful for leak testing a conduit by installing one leak testing device LD of the invention at each end thereof.

Figure 11:
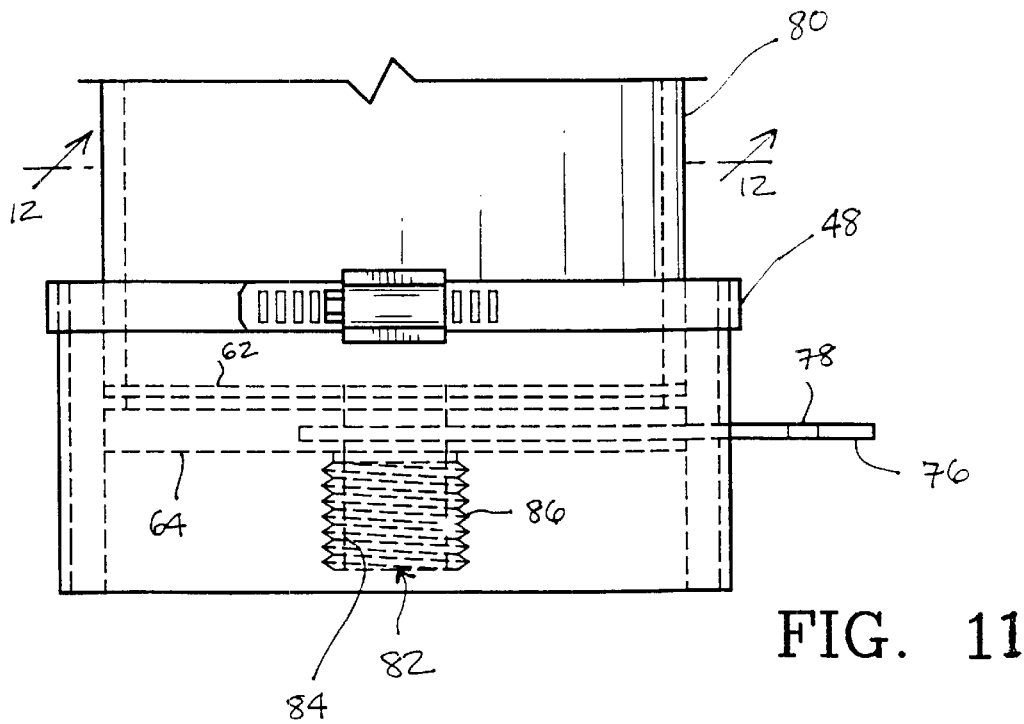
FIG. 11 is a view similar to FIG. 2, showing a third alternative embodiment of the leak testing device installed adjacent an end of a single conduit.
Figure 10:
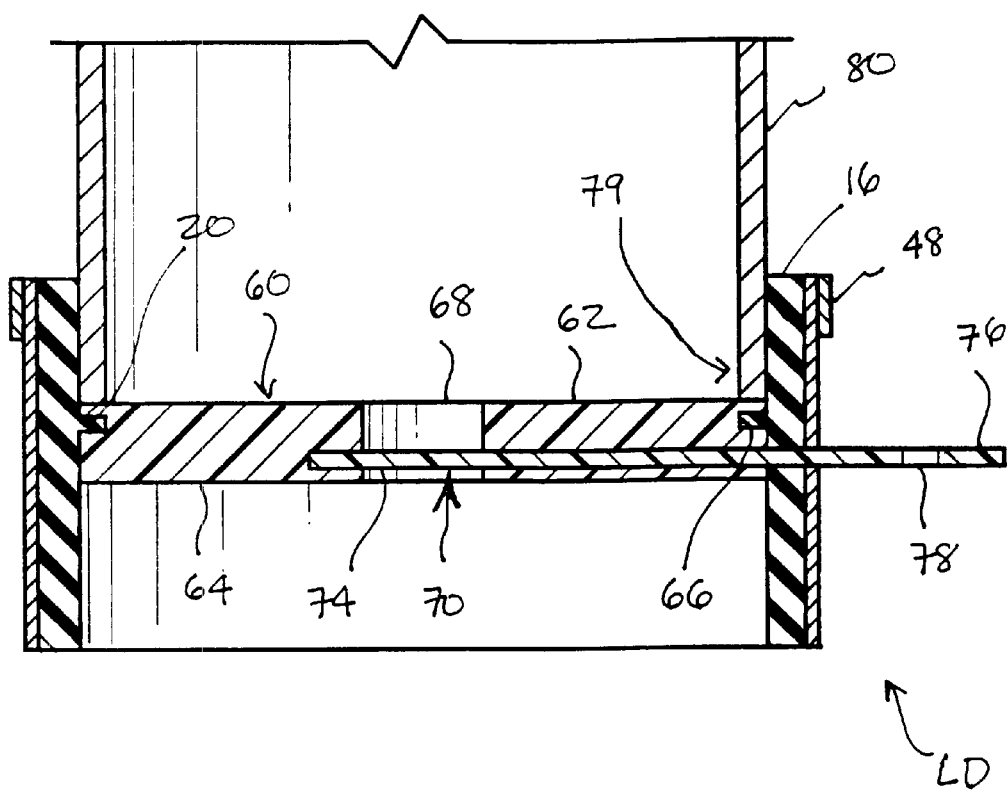
FIG. 10 shows the leak testing device of FIG. 7 installed adjacent an end of a single conduit.
Figure 12:
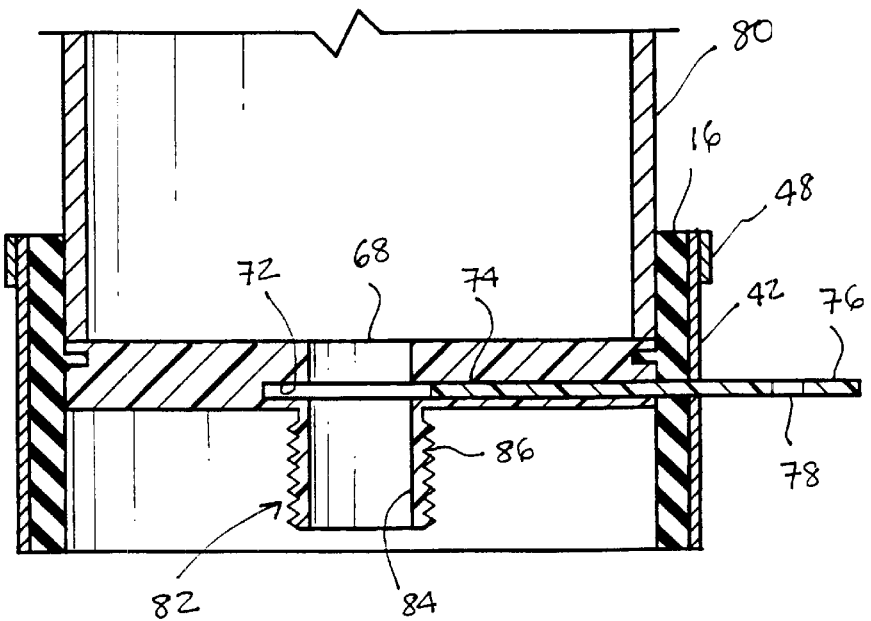
FIG. 12 is a vertical cross-sectional view taken along line 12—12 of FIG. 11.

Referring now to FIGS. 11–13, showing a third alternative embodiment of the leak testing device LD of the invention, which is similar to the embodiment shown in FIG. 10, with the exception that a fluid discharge nipple 82 extends from diaphragm surface 64. The nipple 82 defines an internal passageway 84 that is in fluid communication with the hole 68 and the recess 72.

Preferably, the nipple 82 includes external screw-threads 86 for cooperating with the internal screw-threads of, for example, a garden hose coupling 88. As best shown in FIG. 13, the fluid from conduit 80 may be easily discharged through the garden hose 90 by actuating the valve 74.

USE AND OPERATION

When it is desired to test the leak integrity of a new pipe 12, the leak testing device LD of the present invention is provided such that the respective end portions 11 and 13 of the existing and new pipes 10 and 12 respectively, are slidably received in the recess 18 of gasket 16. As best shown in FIGS. 4–5, the end portion 11 of the pipe 10 would sealingly engage the lower surface 58 of the shoulder portion 20. The end portion 13 of the pipe 12 would come to sealingly engage the diaphragm member 22. The clamp assembly 40 would then be provided and tightened around the gasket 16, to form a fluid-tight engagement between the leak testing device LD and the end portions 11 and 13 of the pipes 10 and 12. The valve handle 34 would then be actuated to close the hole 24 in the diaphragm member 22 (or 56). Upon assuring that the leak testing device LD is in proper fluid-tight engagement with the pipe end portions 11 and 13, the pipe 12 would then be filled with the fluid and allowed to stand until the inspection for any leaks is completed. Upon completion of the inspection, the valve handle 34 would be carefully and slowly pulled outwardly to allow gradual flow of fluid from the new pipe 12 into the existing pipe 10.

The manner of installation and use of the embodiments shown in FIGS. 7–13, is similar to as described above with reference to FIGS. 1–6. It would be appreciated, however, that the shoulder portion 20 would be snugly received in the groove 66 in a fluid-tight manner, and the end portions 11 and 13 of the pipes 10 and 12, respectively, would sealingly engage the respective surfaces 64 and 62 of the diaphragm member 60. When using the leak testing device of the embodiments shown in FIGS. 10–13, it would be particularly appreciated that the clamp assembly 40 would include only one metallic ring 48. With respect to the embodiment of the leak testing device shown in FIGS. 11–13, it would be particularly appreciated that the garden hose 90 (or similar conduit) would be connected to the fluid discharge nipple 82 to allow the fluid from the conduit 80 to flow therethrough to be discharged.

As can be seen from the above, since the opening and closing of the valve assembly 26 (or 70), is done completely external of the pipes 10 and 12, and the fluid flows only between the pipes 10 and 12, the leak testing device LD of the present invention poses no danger to the personnel or the property involved. In addition, the operation of the leak testing device LD of the present invention does not require any additional equipment, such as a pneumatic pump or the like, and thus the entire procedure is straightforward, fast and significantly less complicated than the conventional devices. Finally, since the leak testing device LD of the present invention does not require the use of a T-fitting, significant savings in terms of time and expense are achieved.

It is noted herewith that in the instances where the installation of a T-fitting is necessary, the leak testing device LD of the invention can be simply used in the same manner as without a T. In particular, the upper arm 15 of the T-fitting 14 would take the place of the existing pipe 10 with the lower arm 17 thereof connected to the existing pipe 10, and the leak testing device LD can be operated in the same manner as described above.

While this invention has been described as having preferred designs, it is understood that it is capable of further modifications, uses and/or adaptations of the invention and including such departures from the present disclosure as those come within the known or customary practice in the art to which the invention pertains, and as may be applied to the central features hereinsefforth, and fall within the scope of the invention and of the limits of the appended claims.

What is claimed is:

1. A leak testing device to be positioned between two adjacent conduits, comprising:
   a) a generally cylindrical gasket defining a recess therethrough;
   b) said gasket including first and second end portions for receiving the respective ends of two adjacent conduits;
   c) said gasket including a shoulder portion extending into said recess,
   d) a diaphragm member for positioning within said gasket and including a groove for receiving said shoulder portion;
   e) said diaphragm member including a through hole; and
   f) a valve operably connected to said diaphragm member for selectively opening or closing the hole to thereby permit or restrict the flow of a fluid between the conduits.

2. The leak testing device of claim 1, wherein:
   a) said diaphragm member includes first and second spaced surfaces; and
   b) said groove extends radially between said first and second surfaces.

3. The leak testing device of claim 2, wherein:
   a) said groove extends radially inwardly about the perimeter of said diaphragm member.

4. The leak testing device of claim 2, wherein:
   a) said valve comprises a sliding member; and
   b) said diaphragm member includes a recess for receiving said sliding member.

5. The leak testing device of claim 4, wherein:
   a) said recess is in fluid communication with the hole.

6. The leak testing device of claim 4, wherein:
   a) said recess extends toward the hole.

7. The leak testing device of claim 4, wherein:
   a) said groove and said recess are spaced from each other between said first and second surfaces of said diaphragm member.

8. The leak testing device of claim 1, further comprising:
   a) an adjustable split-clamp for providing about the perimeter of said gasket to thereby sealingly clamp the device about the ends of the conduits.

9. The leak testing device of claim 4, wherein:
a) said valve comprises an operating handle.

10. The leak testing device of claim 1, wherein:
a) said gasket is made of a compressible material; and
b) said diaphragm is made of a substantially rigid material.

11. A method of testing for a leak in a conduit, comprising:
a) providing a first conduit to be leak-tested;
b) providing a second conduit;
c) providing a leak testing device between the ends of the first and second conduits, wherein the leak testing device comprises:
  i) a generally cylindrical gasket defining a recess therethrough;
  ii) said gasket including first and second end portions for receiving the respective ends of the first and second conduits;
  iii) said gasket including a shoulder portion extending into said recess;
  iv) a diaphragm member for positioning within said gasket and including a groove for receiving the shoulder portion;
  v) said diaphragm member including a through hole; and
  vi) a valve operably connected to said diaphragm member for selectively opening or closing the hole to thereby permit or restrict the flow of a fluid between the first and second conduits;
d) actuating the valve to restrict the flow of fluid between the first and second conduits;
e) filling the first conduit with a fluid;
f) inspecting the first conduit for any leaks; and
g) actuating the valve to permit the flow of fluid from the first conduit to the second conduit.

12. A leak testing device to be positioned adjacent an end of a conduit, comprising:
a) a generally cylindrical gasket defining a recess therethrough;
b) said gasket including an end portion for receiving an end of a conduit;
c) said gasket including a shoulder portion extending into said recess;
d) a diaphragm member for positioning within said gasket and including a groove for receiving said'shoulder portion;
e) said diaphragm member including a through hole; and
f) a valve operably connected to said diaphragm member for selectively opening or closing-the hole to thereby permit or restrict the flow of a fluid therethrough.

13. The leak testing device of claim 12, wherein:
a) said diaphragm member includes first and second spaced surfaces; and
b) said groove extends radially between said first and second surfaces.

14. The leak testing device of claim 13, wherein:
a) said groove extends radially inwardly about the perimeter of said diaphragm member.

15. The leak testing device of claim 13, wherein:
a) said valve comprises a sliding member; and
b) said diaphragm member includes a recess for receiving said sliding member.

16. The leak testing device of claim 15, wherein:
a) said recess is in fluid communication with the hole.

17. The leak testing device of claim 15, wherein:
a) said recess extends toward the hole.

18. The leak testing device of claim 15, wherein:
a) said groove and said recess are spaced from each other between said first and second surfaces of said diaphragm member.

19. The leak testing device of claim 12, further comprising:
a) an adjustable split-clamp for providing about the perimeter of said gasket to thereby sealingly clamp the device about the end of the conduit.

20. The leak testing device of claim 15, wherein:
a) said valve comprises an operating handle.

21. The leak testing device of claim 12, wherein:
a) said gasket is made of a compressible material; and
b) said diaphragm is made of a substantially rigid material.

22. A leak testing device to be positioned adjacent an end of a conduit, comprising:
a) a generally cylindrical gasket defining a recess therethrough;
b) said gasket including a first end portion for receiving an end of a conduit;
c) a diaphragm member for positioning within said gasket;
d) said diaphragm member including a through hole;
e) a fluid discharge member operably connected to said diaphragm member and in fluid communication with the hole; and
f) a valve operably connected to said diaphragm member for selectively opening or closing the hole to thereby permit or restrict the flow of a fluid between the hole and the fluid discharge member.

23. The leak testing device of claim 22, wherein:
a) said fluid discharge member extends generally transversely to said diaphragm member.

24. The leak testing device of claim 22, wherein:
a) said fluid discharge member is integral with said diaphragm member.

25. The leak testing device of claim 24, wherein:
a) said diaphragm member is positioned within said gasket in a manner that said fluid discharge member extends away from the end of the conduit.

26. The leak testing device of claim 22, wherein:
a) said gasket includes a second end portion; and
b) said fluid discharge member extends along said second end portion.

27. The leak testing device of claim 26, further comprising:
a) a fluid outlet conduit for connecting with said fluid discharge member.

28. The leak testing device of claim 22, further comprising:
a) an adjustable split-clamp for providing about the perimeter of said gasket to thereby sealingly clamp the device about the end of the conduit.

29. A method of testing for a leak in a conduit, comprising:
a) providing a conduit to be leak-tested;
b) providing a leak testing device adjacent an end of the conduit, wherein the leak testing device comprises:
  i) a generally cylindrical gasket defining a recess therethrough;

ii) said gasket including an end portion for receiving an end of a conduit;
iii) said gasket including a shoulder portion extending into said recess;
iv) a diaphragm member for positioning within said gasket and including a groove for receiving said shoulder portion;
v) said diaphragm member including a through hole; and
vi) a valve operably connected to said diaphragm member for selectively opening or closing the hole to thereby permit or restrict the flow of a fluid therethrough;

c) actuating the valve to restrict the flow of fluid through the hole;
d) filling the conduit with a fluid;
e) inspecting the conduit for any leaks; and
f) actuating the valve to permit the flow of fluid through the hole.

30. A method of testing for a leak in a conduit, comprising:
a) providing a conduit to be leak-tested;
b) providing a leak testing device adjacent an end of the conduit, wherein the leak testing device comprises:
i) a generally cylindrical gasket defining a recess therethrough;
ii) said gasket including an end portion for receiving an end of a conduit;
iii) a diaphragm member for positioning within said gasket;
iv) said diaphragm member including a through hole;
v) a fluid discharge member operably connected to said diaphragm member and in fluid communication with the hole; and
vi) a valve operably connected to said diaphragm member for selectively opening or closing the hole to thereby permit or restrict the flow of a fluid between the hole and the fluid discharge member;

c) actuating the valve to restrict the flow of fluid through the hole,
d) filling the conduit with a fluid;
e) inspecting the conduit for any leaks; and
f) actuating the valve to permit the flow of fluid through the hole.

31. A leak testing device to be positioned adjacent an end of a conduit, comprising:
a) a generally cylindrical gasket defining a recess therethrough;
b) said gasket including a first end portion for receiving an end of a conduit;
c) a diaphragm, member for positioning within said gasket;
d) said diaphragm member including a through hole;
e) first and second connecting members for interconnecting said gasket and said diaphragm member; and
f) a valve operably connected to said diaphragm member for selectively opening or closing the hole to thereby permit or restrict the flow of a fluid therethrough.

32. The leak testing device of claim 31, wherein:
a) one of said first and second connecting members comprises a projection extending from said gasket.

33. The leak testing device of claim 32, wherein:
a) the other of said first and second connecting members comprises a groove for receiving said projection.

34. The leak testing device of claim 33, wherein:
a) said diaphragm member comprises said groove.

35. The leak testing device of claim 34, wherein:
a) said groove extends about the perimeter of said diaphragm member.

36. A method of testing for a leak in a conduit, comprising:
a) providing a conduit to be leak tested;
b) providing a leak testing device adjacent an end of the conduit, wherein the leak testing device comprises:
i) a generally cylindrical gasket defining a recess therethrough;
ii) said gasket including a first end portion for receiving an end of a conduit;
iii) a diaphragm member for positioning within said gasket;
iv) said diaphragm member including a through hole;
v) first and second connecting members for interconnecting said gasket and said diaphragm member; and
vi) a valve operably connected to said diaphragm member for selectively opening or closing the hole to thereby permitter restrict the flow of a fluid therethrough;

c) actuating the valve to restrict the flow of fluid through the hole;
d) filling the conduit with a fluid;
e) inspecting the conduit for any leaks; and
f) actuating the valve to permit the flow of fluid through the hole.

\* \* \* \* \*